J. A. COWLES.
Horse Hay Fork.
No. 46,450.
Patented Feb. 21, 1865.
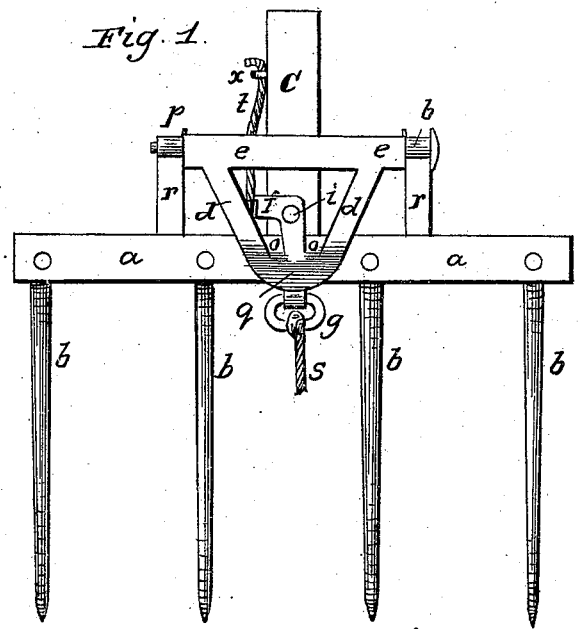
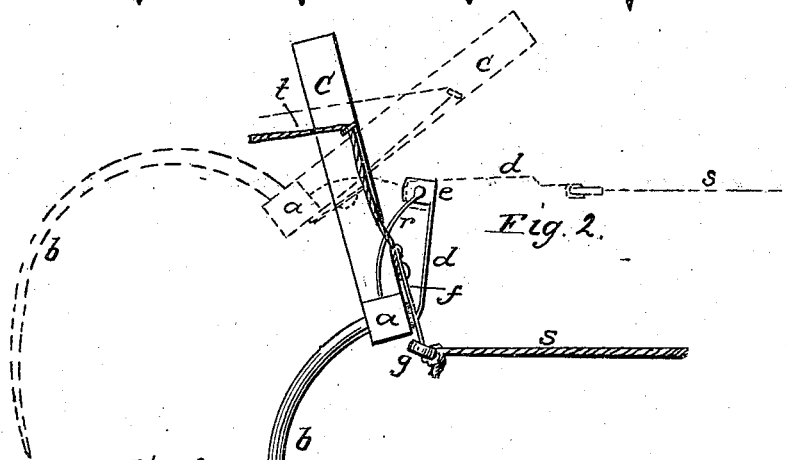
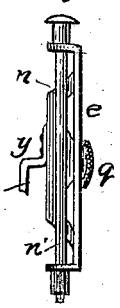
Witnesses:
Inventor:

UNITED STATES PATENT OFFICE.

JAMES A. COWLES, OF CHICAGO, ILLINOIS.

IMPROVEMENT IN HORSE HAY-FORKS.

Specification forming part of Letters Patent No. 46,450, dated February 21, 1865.

*To all whom it may concern:*

Be it known that I, JAMES A. COWLES, of the city of Chicago, county of Cook, and State of Illinois, have invented a new and useful Improvement in Horse Hay-Forks; and I do hereby declare that the following is a full, clear, and exact description of the construction and operation of the same, reference being had to the annexed drawings, making part of this specification.

The nature and object of my invention is to provide a cheap and efficient means of constructing a horse hay-fork so that the bail can be operated with no difficulty, and at the same time provide a simple method of constructing the bail and key, and so locating and adjusting the same with reference to the other parts of the fork as to secure the greatest amount of strength with the least amount of material possible.

Figure 1 is a top view of the fork with the bail properly adjusted ready for use. Fig. 2 is a side view of the fork, showing its position by the dotted lines when in the immediate act of depositing the hay. Fig. 3 is an end view of the bail when in position ready for operation, showing a different construction of the catch upon which one arm of the key rests.

I construct my fork with tines, head, and handle in the ordinary form of horse hay-forks.

Similar letters of reference refer to similar parts in the different figures.

$a\,a$, Fig. 1, is the head, in which are inserted the tines $b\,b\,b\,b$.

$c$ is the handle, also inserted in the head $a\,a$.

$r\,r$ are arms, with eyes $p\,p$ in the outer ends, inserted in the head $a\,a$, on the same side with the handle $c$, and extending backward parallel with the handle a sufficient distance, and curving upward, so that a line drawn through the eyes will pass over the top of the handle $c$.

$d\,d$ are arms of the bail, extending from the eyes $p\,p$ and uniting at $q$, forming a bail.

$e\,e$ is a cross-bar extending across from one end to the other of the arms $d\,d$, forming, with the arms $d\,d$, a triangular bail. The cross-bar $e\,e$ need not from necessity be used. It is, however, better to use it, as it strengthens the bail.

$g$ is a ring attached to the bail at the point $q$, to which is attached the hoisting-rope $s$.

$f$, Fig. 1, is a key made in the form of a right angle, and working upon a pivot, $i$, at the point of intersection of the two arms of the key or right-angled lever.

$t$ is a cord attached to one arm of the key or right-angled lever, and passes through the staple $x$ in handle $c$. The other arm of the key or right-angled lever extends toward the point $q$ and over the catch $o\,o$, extending downward from the bail at the point $q$. This catch is more distinctly shown in Fig. 3 at $y$. The construction of the catch $y$ in Fig. 3 is slightly different from $o\,o$. (Shown in Fig. 1.) At $o\,o$ the catch extends directly backward; at $y$, Fig. 3, it turns to the right, and the arm of the key or right-angled lever, when it is in position for operation, rests upon the shoulder $v$ of the catch $y$.

The operation of this invention is as follows: The operator adjusts the bail by bringing the end $q$ down to or near the head $a$, enabling the key or right-angled lever $f$ to slide over the catch $o\,o$, thus holding it securely. The tines of the fork are then thrust into the hay. Power is then applied through the rope $s$, which lifts the fork with its incumbent mass of hay. When in the act of being lifted, the fork is in the position shown in Fig. 2 with the heavy lines, the hay in the meantime resting upon the tines $b$. When it is elevated to the position desired, the operator pulls the cord $t$ with a sudden jerk. This slides or turns the arm of the key or right-angled lever from the catch $o\,o$, Fig. 1, when the fork instantly assumes the position shown by the dotted lines in Fig. 2, and the hay slides off the tines and is deposited where desired. The entire weight of the hay lifted is brought to bear upon the bail. Hence from necessity the bail must be constructed with great strength. To secure strength the bail must be made of sufficient size, which will involve greater weight.

The location and construction of the bail, the location and construction of the key or right-angled lever and catch $o\,o$, Fig. 1, as shown and described, is believed to secure lighter and stronger operative parts of a horse hay-fork than any hitherto known. The greatest advantage is taken of all the parts. The point of resistance between the bail and key is brought near the point where the power is applied to this bail, thus entirely doing away with any leverage between these points. The arm of the lever $f$, to which is attached the cord $t$, is made longer than the other arm, which rests upon the catch o o, thus securing an advantage to the operator.

Having thus described my invention, what I claim as new, and desire to secure by Letters Patent, is—

1. The combination of the key or right-angled lever f with the bail pivoted at the eyes p p, when said bail is located in the described situation, with the handle c and head a a, as and for the purpose herein set forth.

2. The combination of the head a, handle c, key or right-angled lever f, catch o o, and bail, in the manner, form, and for the purpose described.

JAMES A. COWLES.

Witnesses:
F. C. GOODWIN,
LEWIS H. DAVIS.